(12) United States Patent
Nagatomi et al.

(10) Patent No.: US 7,252,788 B2
(45) Date of Patent: Aug. 7, 2007

(54) PHOSPHOR, LIGHT SOURCE AND LED (75) Inventors: Akira Nagatomi, Tokyo (JP); Kenji Sakane, Tokyo (JP); Masahiro Gotoh, Tokyo (JP); Shuji Yamashita, Tokyo (JP)

(73) Assignee: Dowa Mining Co., Ltd., Tokyo (JP)

( * ) Notice: Subject to any disclaimer, the term of this patent is extended or adjusted under 35 U.S.C. 154(b) by 257 days.

(21) Appl. No.: 10/922,082

(22) Filed: Aug. 20, 2004

(65) Prior Publication Data
US 2005/0189863 A1    Sep. 1, 2005

(30) Foreign Application Priority Data
Feb. 27, 2004    (JP)    ............. 2004-055536

(51) Int. Cl.
C09K 11/08    (2006.01)
H01L 33/00    (2006.01)
H05B 33/14    (2006.01)

(52) U.S. Cl. .............. 252/301.4 F; 252/301.6 F; 252/301.5; 257/98; 313/503

(58) Field of Classification Search .............. 257/98; 313/503; 252/301.5, 301.4 F
See application file for complete search history.

(56) References Cited

U.S. PATENT DOCUMENTS

| 4,477,689 A | 10/1984 | Ogasahara et al. |
| 5,398,398 A | 3/1995 | Williams et al. |
| 5,447,291 A | 9/1995 | Sandhage |
| 6,670,748 B2 * | 12/2003 | Ellens et al. ............ 313/503 |
| 7,138,756 B2 | 11/2006 | Gotoh et al. |
| 2003/0030038 A1 | 2/2003 | Mitomo et al. |
| 2003/0094893 A1 * | 5/2003 | Ellens et al. ............ 313/503 |
| 2003/0213611 A1 | 11/2003 | Morita |
| 2004/0155225 A1 | 8/2004 | Yamada et al. |
| 2005/0189863 A1 | 9/2005 | Nagatomi et al. |
| 2005/0203845 A1 | 9/2005 | Yoshimine et al. |
| 2005/0205845 A1 | 9/2005 | Deising et al. |
| 2005/0253500 A1 | 11/2005 | Gotoh et al. |
| 2005/0267243 A1 | 12/2005 | Amasaki et al. |

(Continued)

FOREIGN PATENT DOCUMENTS

EP    0 459 152 A2    4/1991

(Continued)

OTHER PUBLICATIONS

"Phosphor Handbook"; (compiled by Phosphor Research Society, published by Ohmusha, Ltd., 1987); pp. 172-176.

(Continued)

Primary Examiner—C. Melissa Koslow
(74) Attorney, Agent, or Firm—Oliff & Berridge, PLC (57) ABSTRACT A phosphor with high efficiency having an excitation band corresponding to light of the ultraviolet-visible (300 to 550 nm) wavelength region emitted from a light emitting portion which emits blue or ultraviolet light is provided. A nitride of Ca, a nitride of Al, a nitride Si, and an oxide of Eu are prepared, and respective raw materials are weighed so that a mol ratio of respective elements becomes Ca:Al:Si:Eu=0.985:3:1:0.015, mixed under a nitrogen atmosphere, and thereafter fired at 1500° C. in a nitrogen atmosphere to thereby produce a phosphor having a composition formula $Ca_{0.985}SiAlN_3:Eu_{0.015}$.

15 Claims, 4 Drawing Sheets

U.S. PATENT DOCUMENTS

| | | |
|---|---|---|
| 2006/0006782 A1 | 1/2006 | Nagatomi et al. |
| 2006/0017365 A1 | 1/2006 | Nagatomi et al. |
| 2006/0021788 A1 | 2/2006 | Kohayashi et al. |
| 2006/0022573 A1 | 2/2006 | Gotoh et al. |
| 2006/0033083 A1 | 2/2006 | Sakane et al. |
| 2006/0043337 A1 | 3/2006 | Sakane et al. |
| 2006/0045832 A1 | 3/2006 | Nagatomi et al. |
| 2006/0065878 A1 | 3/2006 | Sakane et al. |
| 2006/0091790 A1 | 5/2006 | Nagatomi et al. |
| 2006/0170332 A1 | 8/2006 | Tamaki et al. |
| 2006/0197432 A1 | 9/2006 | Nagatomi et al. |
| 2006/0197439 A1 | 9/2006 | Sakane et al. |
| 2006/0220047 A1 | 10/2006 | Nagatomi et al. |
| 2006/0220520 A1 | 10/2006 | Sakane et al. |
| 2006/0244356 A1 | 11/2006 | Nagatomi et al. |
| 2007/0029525 A1 | 2/2007 | Gotoh et al. |

FOREIGN PATENT DOCUMENTS

| | | |
|---|---|---|
| EP | 0 459 156 A2 | 4/1991 |
| EP | 1 296 376 A2 | 3/2003 |
| EP | 1 445 295 A1 | 8/2004 |
| JP | A 5-15655 | 1/1993 |
| JP | 05-198433 | 8/1993 |
| JP | 11-144938 | 5/1999 |
| JP | 11-277527 | 10/1999 |
| JP | 2000-073053 | 3/2000 |
| JP | 2000-153167 | 6/2000 |
| JP | A 2001-214162 | 8/2001 |
| JP | 2002-363554 | 12/2002 |
| JP | 2003-013059 | 1/2003 |
| JP | 2003-096446 | 4/2003 |
| JP | A 2003-124527 | 4/2003 |
| JP | A 2003-515655 | 5/2003 |
| JP | A 2003-277746 | 10/2003 |
| JP | A 2003-336059 | 11/2003 |
| JP | 2004-055536 | 2/2004 |
| JP | 2004-055910 | 2/2004 |
| JP | 2004-505470 | 2/2004 |
| JP | 2004-067837 | 3/2004 |
| JP | 2004-145718 | 5/2004 |
| JP | 2004-189997 | 7/2004 |
| JP | 2004-235598 | 8/2004 |
| JP | 2004-244560 | 9/2004 |
| JP | 2005-344025 | 12/2005 |
| JP | 2006-028295 | 2/2006 |
| JP | 2006-063214 | 3/2006 |
| JP | 2006-063286 | 3/2006 |
| JP | 2006-070109 | 3/2006 |
| JP | 2006-176546 | 7/2006 |
| WO | WO 01/40403 A1 | 6/2001 |
| WO | WO 02/11214 A1 | 2/2002 |
| WO | WO 2004/030109 A1 | 4/2004 |
| WO | WO 2004/039915 A1 | 5/2004 |
| WO | WO 2004/055910 A1 | 7/2004 |
| WO | WO 2005/052087 A1 | 6/2005 |

OTHER PUBLICATIONS

JIS Z 8726; "Method of Specifying Colour Rendering Properties of Light Sources"; (1990).

U.S. Appl. No. 11/194,590, filed in the U.S. Patent and Trademark Office on Aug. 2, 2005.

U.S. Appl. No. 11/194,590, filed Aug. 2, 2005.

K. Uheda et al., "The Crystal Structure and Photoluminescence Properties of a New Red Phosphor, Calcium Aluminum Silicon Nitride Doped With Divalent Euroium," Abs. 2073, 206th Meeting., Oct. 3, 2004.

* cited by examiner

PHOSPHOR, LIGHT SOURCE AND LED

BACKGROUND OF THE INVENTION

1. Field of the Invention

The present invention relates to a phosphor used in a display device such as an LED, CRT, PDP, FED, and EL, and a lighting unit such as a vacuum fluorescent display (VFD) and fluorescent lamp, the phosphor being particularly suitable for an LED, a light source, and a lighting unit each of which has a light emitting portion of ultraviolet-blue light or the like and emits visible or white light.

2. Description of the Related Art

An LED, a light source and a lighting unit are known, which emit white light by a combination of a light emitting element which emits blue or ultraviolet light and a phosphor which has an excitation band in the ultraviolet-blue wavelength region generated from the light emitting element.

As the phosphor used in the LED and the like, $Y_2O_2S:Eu$, $La_2O_2S:Eu$, $3.5MgO.0.5MgF_2.GeO_2:Mn$, and $(La, Mn, Sm)_2O_2S.Ga_2O_3$ are known as a red phosphor, $ZnS:Cu,Al$, $SrAl_2O_4:Eu$, and $BAM:Eu,Mn$ are known as a green phosphor, $YAG:Ce$ is known as a yellow phosphor, and $BAM:Eu$, $Si_5(PO_4)_3Cl:Eu$, $ZnS:Ag$, and $(Sr, Ga, Ba, Mg)_{10}(PO_4)_6Cl:Eu$ are known as a blue phosphor. Then, an LED, a light source and a lighting unit of white or monochromatic light can be obtained by combining these phosphors and a light emitting element.

As a phosphor for a white LED, there are suggested an oxynitride glass phosphor (refer to Patent Document 1) a phosphor having a sialon as a host material (refer to Patent Documents 2 and 3), and a phosphor including, nitrogen of a silicon nitride group or the like (refer to Patent Documents 4 and 5), and there is further suggested a lighting device using these phosphors.

[Patent Document 1] Japanese Patent Application Laid-open No. 2001-214162

[Patent Document 2] Japanese Patent Application Laid-open No. 2003-336059

[Patent Document 3] Japanese Patent Application Laid-open No. 2003-124527

[Patent Document 4] Translated National Publication of Patent Application No. 2003-515655

[Patent Document 5] Japanese Patent Application Laid-open No. 2003-277746

SUMMARY OF THE INVENTION

With respect to the above-described LED and light source which emit visible light or white light by a combination of a light emitting portion which emits blue or ultraviolet light and a phosphor which has an excitation band corresponding to light of the ultraviolet-blue wavelength region generated from the light emitting portion, it is strongly demanded to improve not only the emission efficiency of the light emitting portion but also the emission efficiency of the phosphor, in order to improve luminance of the visible light or white light.

Hereinafter, the phosphor will be described with an example of an LED which emits white light by a combination of a light emitting element which emits blue or ultraviolet light and a phosphor.

In the case that the phosphor is used as a phosphor for a white LED, luminance of the entire white LED is improved by the emission efficiency of the phosphor, so that a phosphor which emits light with better efficiency with respect to the emission wavelength of the light emitting element has been demanded.

For example, an excitation band of YAG:Ce based yellow phosphor is in an efficient excitation range when emitting light by blue light of a light emitting element of an LED, and thus it can produce good yellow light emission. However, when emitting light by ultraviolet light of a light emitting element of an LED, it deviates from the excitation range, so that it cannot produce high light emission.

Further, regarding a red phosphor, existing phosphors have poor emission efficiency, so that when it is mixed with a phosphor of different color, there is adopted a method to compensate a light emitting amount by increasing the compounding ratio of the phosphor of a red component. However, a phosphor with higher efficiency has been demanded.

The present invention is made in view of the above-described situation, and an object thereof is to provide a phosphor with high efficiency having an excitation band corresponding to light of the ultraviolet-visible (300-550 nm) wavelength region emitted from a light emitting element which emits blue or ultraviolet light.

As a result of study on host material compositions of various phosphors with respect to the above-described object, the inventors of the present invention devised a phosphor with higher efficiency and an excellent light emitting characteristic, which has a new host material composition.

According to a first aspect of the present invention, a phosphor represented by a general formula M—A—B—N:Z is provided, wherein the element M is a divalent element; the element A is a trivalent element, the element B is a tetravalent element, the N is nitrogen, and the element Z is an activator in the phosphor.

According to a second aspect of the present invention, the phosphor described in the first aspect is provided, wherein when the phosphor is represented by a composition formula $M_mA_aB_bN_n:Z_z$, the phosphor has a composition ratio $(m+z):a:b:n=1:1:1:3$.

According to a third aspect of the present invention, the phosphor described in the first or the second aspect is provided, wherein the element M is at least one or more elements selected from the group consisting of beryllium, magnesium, calcium, strontium, barium, zinc, cadmium, and mercury, wherein the element A is at least one or more elements selected from the group consisting of boron, aluminum, gallium, indium, thallium, yttrium, scandium, phosphorus, arsenic, antimony, and bismuth, wherein the element B is at least one or more elements selected from the group consisting of carbon, silicon, germanium, tin, titanium, hafnium, molybdenum, tungsten, chromium, lead, and zirconium, and wherein the element Z is at least one or more elements selected from rare-earth elements or transition metal elements.

According to a fourth aspect of the present invention, the phosphor described in any one of the first to the third aspect is provided, wherein the element A is aluminum and the element B is silicon.

According to a fifth aspect of the present invention, the phosphor described in any one of the first to the fourth aspect is provided, wherein a host material structure of the phosphor does not include oxygen.

According to a sixth aspect of the present invention, the phosphor described in any one of the second to the fifth aspect is provided, wherein a value of a mol ratio: z/(m+z) of the element M and the activator element Z is in a range from 0.0001 to 0.5.

According to a seventh aspect of the present invention, the phosphor described in any one of the first to the sixth aspect is provided, wherein the element M is at least one or more elements selected from the group consisting of magnesium, calcium, strontium:, barium, and zinc.

According to an eighth aspect of the present invention, the phosphor described in any one of the first to the seventh aspect is provided, wherein the element Z is at least one or more elements selected from the group consisting of europium, manganese, and cerium.

According to a ninth aspect of the present invention, the phosphor described in the eighth aspect is provided, wherein the element Z is europium.

According to a tenth aspect of the present invention, the phosphor described in the ninth aspect is provided, wherein the element M is calcium, the element A is aluminum, and the element B is silicon.

According to an eleventh aspect of the present invention, the phosphor described in any one of the first to the tenth aspect is provided, wherein the phosphor is in a powder form.

According to a twelfth aspect of the present invention, the phosphor described in the eleventh aspect is provided, wherein an average particle size of the phosphor is 20 μm or smaller and 1 μm or larger.

According to a thirteenth aspect of the present invention, a light source is provided, which comprises:

a phosphor described in any one of the first to the twelfth aspect; and a light emitting portion emitting light of a first wavelength, wherein a part of the light of the first wavelength is used as an excitation source to make the phosphor emit light having a wavelength which is different from the first wavelength.

According to a fourteenth aspect of the present invention, the light source described in the thirteenth aspect is provided, wherein the first wavelength is a wavelength of from 300 nm to 550 nm.

According to a fifteenth aspect of the present invention, a light emitting diode is provided, which comprises:

a phosphor described in any one of the first to the twelfth aspect; and a light emitting portion emitting light of a first wavelength, wherein a part of the light of the first wavelength is used as an excitation source to make the phosphor emit light having a wavelength which is different from the first wavelength.

According to a sixteenth aspect of the present invention, the light emitting diode described in the fifteenth aspect is provided, wherein the first wavelength is a wavelength of from 300 nm to 550 nm.

The phosphor represented: by a general formula M—A—B—N:Z according to the first to the eleventh aspect has an excitation band corresponding to ultraviolet-blue light (wavelength region of from 300 to 550 nm) emitted by a light emitting element which emits blue or ultraviolet light, and emits light with high efficiency. Therefore, by combining the phosphor with a light emitting portion which emits the ultraviolet-blue light, an LED, a light source and a lighting unit of monochromatic light or white light with high efficiency and high luminance can be obtained.

DETAILED DESCRIPTION OF THE PREFERRED EMBODIMENTS

A phosphor according to the present invention is a phosphor having a quaternary host material structure represented by a general formula M—A—B—N:Z.

Here, the element M is a divalent element in the phosphor. The element A is a trivalent element in the phosphor. The element B is a tetravalent element in the phosphor. N is nitrogen. The element Z operates as an activator in the phosphor. When the phosphor has this host, material structure, it becomes a phosphor having high emission efficiency.

Furthermore, when the above-described host material structure of the phosphor has a chemically stable structure, it is unlikely to have an uneven phase, so that emission efficiency does not decrease. Therefore, it is a preferable structure. Then, when the phosphor is represented by a composition formula $M_mA_aB_bN_n:Z_z$, the phosphor is preferred to have a composition ratio (m+z):a:b:n=1:1:1:3, in order to make the host material structure of the phosphor have a chemically stable structure. This is because the element M is a divalent element, the element A is a trivalent element, and the element B is a tetravalent element, which combine with trivalent nitrogen to be a stable nitrogen compound. However, it is conceivable that a slight displacement in composition may occur.

Here, since a divalent metal nitride normally takes a chemical formula $M_3N_2$, a trivalent metal nitride takes a chemical formula AN, and the tetravalent metal nitride takes a chemical formula $B_3N_4$, the respective nitrides may be mixed by a mol ratio of 1:3:1 so that they become M:A:B=1:1:1. However, the element Z replaces a part of the element M when a divalent element is used as an activator for example, so that it becomes (m+z):a:b:n=1:1:1:3.

Thus, it is conceivable that the chemically stable structure can be achieved, and the phosphor with high efficiency and high luminance can be obtained.

The element M is preferably at least one or more elements selected from the group consisting of Be, Mg, Ca, Sr, Ba, Zn, Cd, and Hg. In other words, the element M may be single Ca, or may be a mixture of Ca, Mg . . . , and the like for example.

The element A is preferably at least one or more elements selected from the group consisting of B (boron), Al, Ga, In, Ti, Y, Sc, P, As, Sb, and Bi. In other words, the element A may be single Al, or may be a mixture of Al, Ga . . . , and the like for example.

The element B is preferably at least one or more elements selected from the group consisting of C, Si, Ge, Sn, Ni, Hf, Mo, W, Cr, Pb, and Zr. In other words, the element B may be single Si, or may be a mixture of Si, Ge . . . , and the like for example.

The element Z is preferably at least one or more elements selected from rare-earth elements and transition metal elements. In other words, the element Z may be single Eu, or may be a mixture of Eu, La . . . , and the like for example.

By the element M, element A, element B, and element Z having the above-described structure, the emission efficiency of the phosphor increases further.

Respective nitrides of Al as the element A and Si as the element B are generally used in thermally conductive materials and structural materials, and they are easily obtainable and cheap. In addition, their environmental loads are low. Therefore, by selecting these elements as a raw material, cheap and easily usable phosphor can be obtained, so that it is a preferable composition.

As is clear from the general formula M—A—B—N:Z, the phosphor according to the present invention does not include oxygen in the constituting elements, and it is a different composition group from a conventional phosphor having a sialon group host material (Si—Al—O—N group) and phosphor having a Si—O—N group host material. According to the study conducted by the inventors of the present invention, it is found that when the oxygen content in the phosphor is large, the emission efficiency decreases and the emission wavelength of the phosphor tends to shift to a shorter wavelength side. From this point of view, the phosphor according to the present invention which includes no oxygen in the host material constituting elements has higher emission efficiency and can avoid the shift of the emission wavelength to the shorter wavelength side, so that it is a preferable composition.

In the phosphor according to the present invention, a mol ratio z/(m+z) of the element M and the activator element Z are preferred to be in a range from 0.0001 to 0.5. When the mol ratio z/(m+z) of the element M and the activator element Z is in that range, it is possible to avoid decrease of emission efficiency due to concentration quenching caused by an excessive content of the activator, and on the other hand, it is also possible to avoid decrease of emission efficiency due to an excessively small amount of light emission contributing atoms caused by an excessively small content of the activator. Depending on the type of the activating element Z to be added, an optimum percentage of z/(m+z) differs slightly, and more preferably, good light emission can be produced when it is in a range from 0.0005 to 0.1.

When the element M of the phosphor of the present invention is at least one or more elements selected from the group consisting of Mg, Ca, Sr, Ba, and Zn, a raw material can be easily obtained and an environmental load is low, so that it is a preferable composition.

When the element Z of the phosphor of the present invention is at least one or more elements selected from the group consisting of Eu, Mn, and Ce, emission efficiency of the phosphor becomes high, so that it is a preferable composition.

When the element Z of the phosphor of the present invention is Eu, the emission wavelength exhibits red wavelength, so that a red based phosphor for a white light emitting unit with good emission efficiency can be obtained, and thus it is a preferable composition.

When the element M is Ca, the element A is Al, the element B is Si, and the element Z is Eu in the phosphor of the present invention, raw materials can be easily obtained and an environmental load is low, and the emission wavelength of the phosphor exhibits red wavelength, so that a red based phosphor capable of producing white light with good emission efficiency can be obtained, and thus it is a preferable composition.

When the phosphor according to the present invention is in a powder form, the average particle size of the powder is preferred to be 20 μm or smaller. This is because light emission of the phosphor powder is is considered to occur mainly on the surface of a particle, and a surface area of the phosphor powder per unit weight becomes smaller when the average particle size is larger than 20 μm. Further, according to the study conducted by the inventors of the present invention, emission efficiency decreases also when the average particle size is 1 μm or smaller. Accordingly, the average particle size of the phosphor powder of the present invention being 20 μm or smaller and 1 μm or larger is a preferable composition.

In addition, when considering a case that the phosphor powder is used as phosphor powder for an LED, the phosphor powder is mixed with resin to be applied on the LED, and then, also from a point of view to obtain good applicability, the average particle size is preferred to be 20 μm or smaller and 1 μm or larger.

By combining the phosphor obtained according to the present invention with, for example, a light source which emits blue or ultraviolet light, a light source of monochromatic visible light or white light with high efficiency can be produced.

The phosphor obtained according to the present invention emits light upon reception of light in a wide excitation range from 300 to 550 nm, so that a light source of monochromatic visible light or white light with high efficiency can be produced by combining the phosphor with, for example, a light source which emits blue or ultraviolet light.

By combining the phosphor obtained according to the present invention with, for example, an LED light emitting portion which emits blue or ultraviolet light, an LED of monochromatic visible light or white light with high efficiency can be produced.

The phosphor obtained according to the present invention emits light upon reception of light in a wide excitation range from 300 to 550 nm, so that an LED of monochromatic visible light or white light with high efficiency can be produced by combining the phosphor with an LED light emitting portion which emits blue or ultraviolet light.

(Production Method of the Phosphor)

A production method of the phosphor according to the present invention will be described with an example of producing $CaAlSiN_3$:Eu (when z/(m+z)=0.015).

First, nitrides of the element M, element A, and element B are prepared. The respective nitrides may be a commercially available raw material. Since they are preferred to have high purity, raw materials of 2N or higher, or more preferably 3N or higher are prepared. As a raw material of the element Z, an oxide may be prepared, which may be a commercially available raw material. Since it is preferred to have high purity, a raw material of 2N or higher, or more preferably 3N or higher is prepared.

When $CaAlSiN_3$:Eu is produced, $Ca_3N_2$ (2N), AlN (3N), and $Si_3N_4$ (3N) may be prepared as nitrides of the element. M, element A, and element B respectively. As the element Z, $Eu_2O_3$ (3N) may be prepared.

These raw materials are weighed and mixed so that a mol ratio of the respective elements becomes M:A:B:Z=0.985:3:1:0.015. As a matter of course, the value 0.985 of the element M and the value 0.015 of the element Z are set corresponding to the set value of z/(m+z)=0.015, and they vary according to variation of the set value.

The mixing may be performed by a general mixing method using a mortar or the like, and is performed under an inert atmosphere of nitrogen or the like. Operation inside a glove box under an inert atmosphere is convenient.

The raw materials after being completely mixed are heated to 1500° C. by a heating rate of 15° C./min under an inert atmosphere of nitrogen or the like, and retained and fired at 1500° C. for three hours. After the burning is completed, the raw materials are cooled down from 1500° C. to 200° C. for an hour, further cooled down to the room temperature, and thereafter pulverized using a pulverizing means such as a mortar, ball mill, or the like to have a predetermined average particle size (preferably, from 20 μm to 1 μm) to thereby produce a phosphor of a composition formula $Ca_{0.955}SiAlN_3:EU_{0.015}$.

When the element M, the element A, the element B, and the element Z are replaced with other elements, a predetermined phosphor can be produced by a similar production method by setting compounding amounts of the respective raw materials to a predetermined composition formula at the time of preparation, even when set values of z/(m+z) vary.

EXAMPLES

Hereinafter, the present invention will be described more specifically based on examples.

Example 1

Commercially available $Ca_3N_2$ (2N), AlN (3N), $Si_3N_4$ (3N), and $EU_2O_3$ (3N) were prepared, and respective raw materials were weighed so that the mol ratio of respective elements becomes Ca:Al:Si:Eu=0.985:3:1: 0.015 and mixed using a mortar inside a glove box under a nitrogen atmosphere. The mixed raw materials were heated to 1500° C. by a heating rate of 15° C./min in a nitrogen atmosphere, retained and fired at 1500° C. for three hours, and cooled down thereafter from 1500° C. to 200° C. for an hour to obtain a phosphor of the composition formula $Ca_{0.985}SiAlN_3:Eu_{0.015}$. Results of analysis of the obtained phosphor powder are shown in Table 1.

The average particle size (D50) of the obtained phosphor was 4.65 μm, and the specific surface area thereof was 1.13 m²/g, and 2.2% of the total weight was occupied by oxygen as an impurity.

Next, an emission spectrum and an excitation spectrum of the phosphor of the present invention were measured. Results of the measurement will be described with reference to FIG. 1 and FIG. 2. Here, in both FIG. 1 and FIG. 2, luminescence intensity of the phosphor of the present invention is taken on the vertical axis, and a wavelength of light is taken on the horizontal axis.

Figure 1:
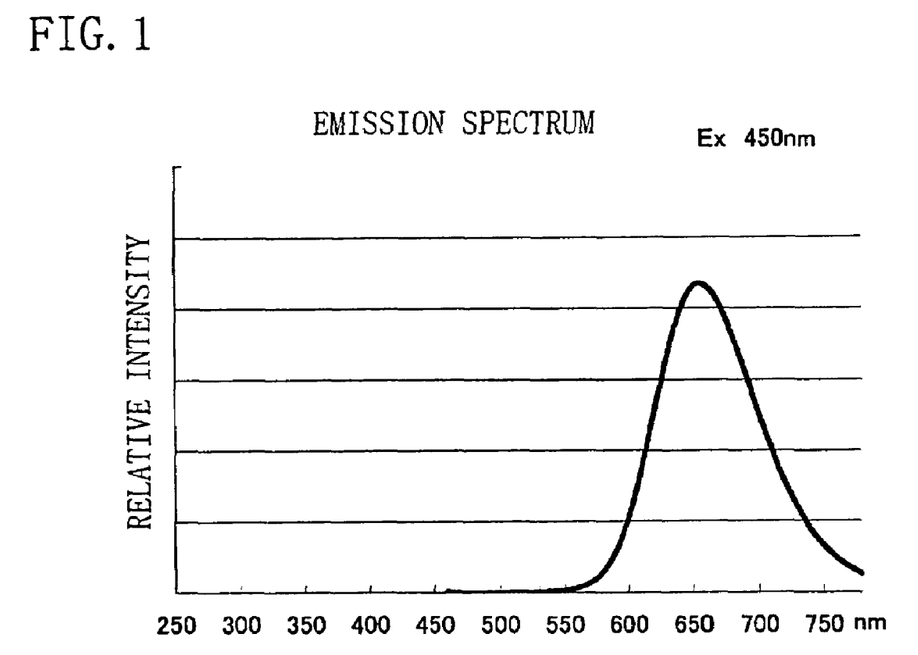
FIG. 1 is a graph of an emission spectrum of a phosphor according to the present invention.

First, the emission spectrum of the phosphor according to the present invention will be described using FIG. 1. The emission spectrum is a spectrum emitted from an object when the object is irradiated with light or energy having a certain wavelength. FIG. 1 shows a wavelength spectrum emitted from the phosphor of the present invention when the phosphor is irradiated with monochromatic light of 450 nm.

As is clear from FIG. 1, the phosphor exhibits light emission in a wide wavelength region from 550 nm to 800 nm, and exhibits the highest light emission at 656 nm. Incidentally, red light emission color was recognized by visual observation.

Next, the excitation spectrum of the phosphor of the present invention will be described using FIG. 2. The excitation spectrum is a spectrum measured in such a manner that a phosphor that is a subject to be measured is excited using monochromatic light of various wavelengths, luminescence intensity with a constant wavelength of light emission from the phosphor is measured, and excitation wavelength dependency of the luminescence intensity is measured. In this measurement, the phosphor of the present invention was irradiated with monochromatic light of from 250 nm to 570 nm, and excitation dependency of the luminescence intensity of light with a wavelength of 656 nm emitted from the phosphor was measured.

Figure 2:
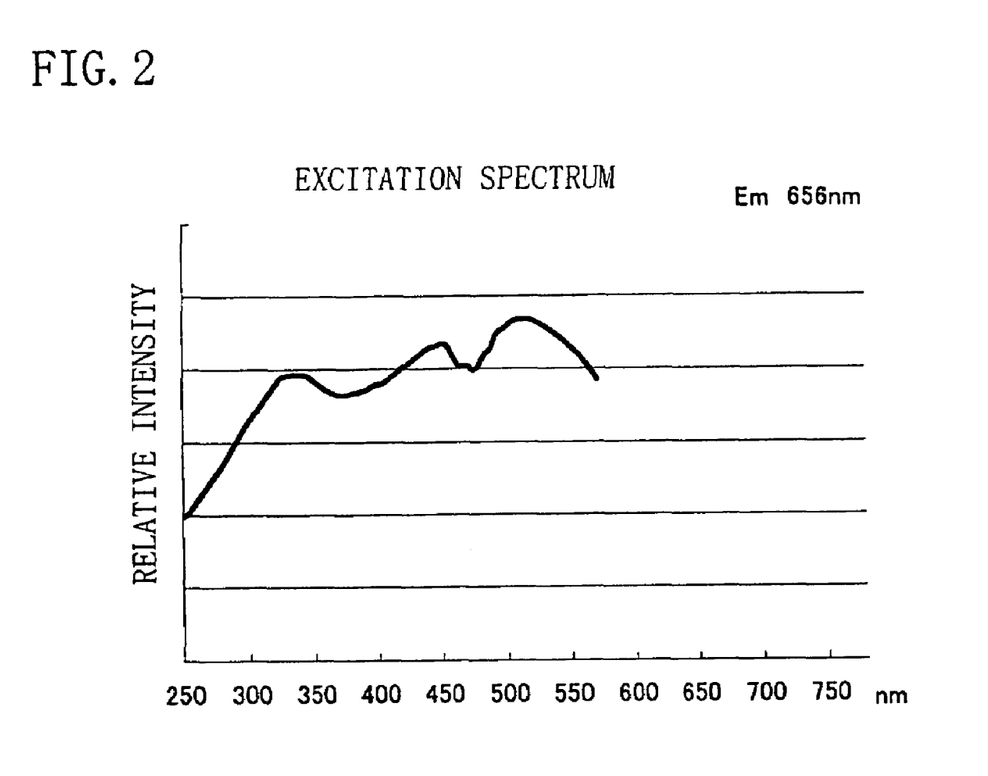
FIG. 2 is a graph of an excitation spectrum of the phosphor according to the present invention.

As is clear from FIG. 2, the excitation spectrum of the phosphor is wide, from approximately 300 nm to 600 nm, and it was found that the phosphor exhibits high emission of red light in a wide range of the excitation band from approximately 300 nm to 600 nm.

Example 2

In Example 2, the phosphor according to the present invention having a composition formula $Ca_mSiAlN_3:Eu_z$ was used to measure the luminescence intensity depending on concentration of the activator element Z.

When producing a measurement sample, addition amounts of Ca and Eu were adjusted so that the concentration of the activator Eu has a relationship of m+z=1 with Ca.

Results of the measurement will be described with reference to FIG. 3. Here, in FIG. 3, luminescence intensity of the phosphor of the present invention is taken on the vertical axis, and a value of Eu/(Eu+Ca), which is a compounding ratio of Ca and Eu, is taken on the horizontal axis. Note that luminescence intensity when Eu/(Eu+Ca)=0.015 is set as 100%. Then, results of adjusting the value of Eu/(Eu+Ca) from 0.0015 to 0.06 are shown. Note that light having a wavelength of 450 nm was, used for excitation.

Figure 3:
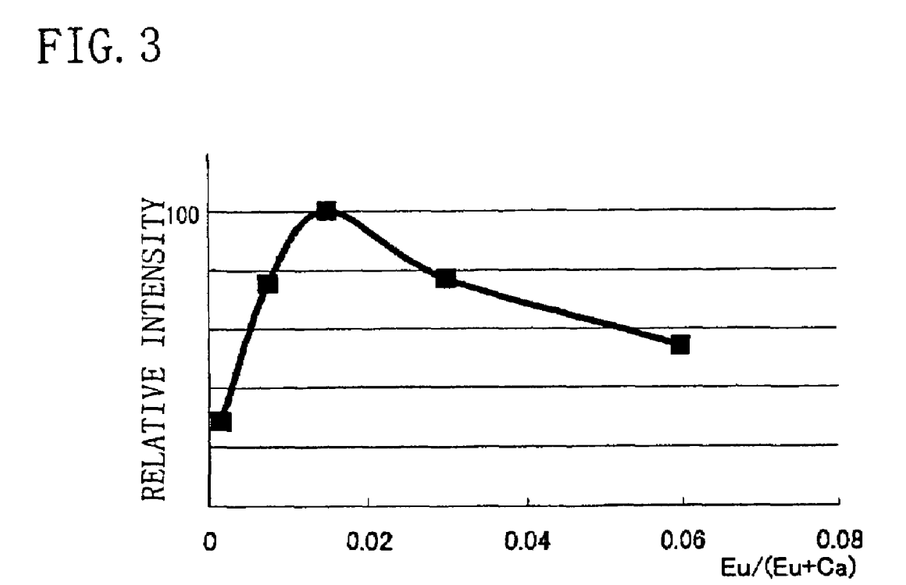
FIG. 3 is a graph of a composition and luminescence intensity of the phosphor according to the present invention.

As is clear from the results in FIG. 3, the luminescence intensity first rises with increase of the value of Eu/(Eu+Ca), but the luminescence intensity starts to decrease at a peak of approximately 0.015. A conceivable reason of this is that, at a portion where the value is less than 0.015, the activator element is not sufficient, and at a portion where the value is more than 0.015, there occurs concentration quenching caused by the activator element.

In addition, in parallel to the measurement of the luminescence intensity, chromaticity coordinates (x, y) of the light emission were also measured. Results of the measurement are shown in Table 2. As is clear from the results in Table 2, it was confirmed that, as the value of Eu/(Eu+Ca) increases, an emission maximum also shifts to a longer wavelength side.

TABLE 1

|  | Ca (%) | Al (%) | Si (%) | N (%) | Eu (%) | O (%) | Others | Average particle size (D50) | Specific surface area |
|---|---|---|---|---|---|---|---|---|---|
| $Ca_{0.985}AlSiN_3: Eu_{0.015}$ | 27.3 | 20.5 | 19.2 | 29.2 | 1.46 | 2.2 | 0.1 | 4.65 μm | 1.13 m²/g |

TABLE 2

| | Eu concentration | Relative intensity | Emission maximum | Ex: 450 nm x | y |
|---|---|---|---|---|---|
| $Ca_{0.9975}AlSiN_3: Eu_{0.0015}$ | 0.0015 | 28.8% | 632.7 | 0.608 | 0.384 |
| $Ca_{0.9925}AlSiN_3: Eu_{0.0075}$ | 0.0075 | 75.5% | 644.3 | 0.651 | 0.346 |
| $Ca_{0.985}AlSiN_3: Eu_{0.015}$ | 0.0150 | 100.0% | 651.3 | 0.671 | 0.327 |
| $Ca_{0.97}AlSiN_3: Eu_{0.03}$ | 0.0300 | 77.0% | 660.0 | 0.683 | 0.315 |
| $Ca_{0.94}AlSiN_3: Eu_{0.06}$ | 0.0600 | 54.1% | 670.2 | 0.691 | 0.306 |

Example 3

On an LED of ultraviolet light having a nitride semiconductor as a light emitting portion, the phosphor obtained according to the present invention, a commercially available blue phosphor (BAM:Eu), and a commercially available green phosphor (ZnS:Cu, Al) were applied, and the LED of ultraviolet light was illuminated. Then, the respective phosphors emitted light by light from the LED, and an LED which appears to be white when visually observed due to a spectrum of emission wavelength was obtained.

Further, on an LED of blue light having a nitride semiconductor as a light emitting portion, the phosphor obtained in the present invention and a commercially available yellow phosphor (YAG:Ce) were applied, and the LED of blue light was illuminated. Then, the respective phosphors emitted light by light from the LED, and a reddish LED having a low color temperature when visually observed was obtained.

Example 4

In Example 4, the phosphor according to the present invention and a $Ca_2Si_5N_8$:Eu phosphor disclosed in Patent Documents 4 and 5 were compared.

It should be noted that, for the $Ca_2Si_5N_8$:Eu phosphor used in this example, 2N or 3N reagents, of $Ca_3N_7$, $Si_3N_4$, and $EU_2O_3$ were prepared as raw materials, and the respective raw materials were weighed so that Ca, Si, and Eu have a mol ratio of 1.97:5:0.03 and mixed by a mortar inside a glove box under a nitrogen atmosphere. The mixed raw materials were fired at 1500° C. in nitrogen for three hours and then cooled down and pulverized similarly to Example 1 to thereby produce a phosphor of a composition formula $Ca_{1.97}Si_5N_8:Eu_{0.03}$.

Results of an analysis of the phosphor of the composition formula $Ca_{0.985}SiAlN_3:Eu_{0.015}$ according to the present invention which is produced in Example 1 and the phosphor of the composition formula $Ca_{1.97}Si_5N_8:Eu_{0.03}$ are shown in parallel in Table 3.

As is clear from the results in Table 3, contents of oxygen and other elements as impurities in both the produced phosphors were approximately the same, and specific surface areas of both the phosphors were also approximately the same.

TABLE 3

| | Ca (%) | Al (%) | Si (%) | N (%) | Eu (%) | O (%) | Others | Average particle size (D50) | Specific surface area |
|---|---|---|---|---|---|---|---|---|---|
| $Ca_{0.985}AlSiN_3: Eu_{0.015}$ | 27.3 | 20.5 | 19.2 | 29.2 | 1.46 | 2.2 | 0.1 | 4.65 μm | 1.13 m²/g |
| $Ca_{1.97}Si_5N_8: Eu_{0.03}$ | 22.3 | 0.3 | 39.6 | 34.2 | 1.34 | 2.1 | 0.2 | 4.77 μm | 1.11 m²/g |

Next, emission spectra of both the above-described phosphors were measured and compared similarly to Example 1. However, monochromatic light of 460 nm was used as light to be irradiated. Results of the measurement are shown in FIG. 4 and Table 4.

Figure 4:
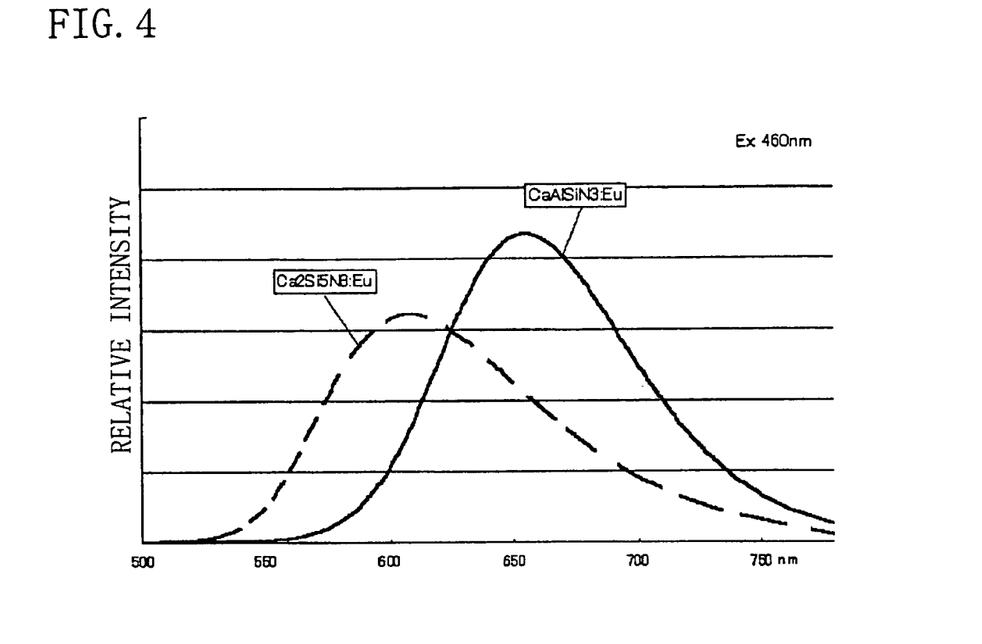
FIG. 4 is a graph of emission spectra of phosphors according to the present invention and a conventional art.

FIG. 4 is a graph similar to FIG. 1, in which the emission spectrum of the phosphor according to the present invention is shown by a solid line, and the emission spectrum of the phosphor of the composition formula $Ca_{1.97}Si_5N_8:Eu_{0.03}$ is shown by a dashed line.

TABLE 4

| | Excitation wave length | Relative intensity | Emission maximum | Chromaticity x | y |
|---|---|---|---|---|---|
| $Ca_{0.985}AlSiN_3: Eu_{0.015}$ | 460 nm | 137.4% | 656.2 | 0.671 | 0.327 |
| $Ca_{1.97}Si_5N_8: Eu_{0.03}$ | 460 nm | 100.0% | 609.2 | 0.593 | 0.405 |

As is clear from the results in FIG. 4 and Table 4, the phosphor according to the present invention was approximately 40% higher in relative intensity as compared to the :phosphor of the composition formula $Ca_{1.91}Si_5N_8:Eu_{0.03}$, and it was found to be a highly efficient phosphor. More advantageously, while the phosphor of the composition formula $Ca_{1.97}Si_5N_8: Eu_{0.03}$ has an emission maximum at approximately 610 nm and is orange when visually observed, the phosphor according to the present invention has an emission maximum at approximately 656 nm, so that it is closer to red. Therefore, when making a white LED by combining it with another phosphor, a mixing ratio of a red based phosphor can be reduced.

What is claimed is:
1. A phosphor represented by a general formula M—A—B—N:Z,
   wherein the element M is a divalent element, the element A is a trivalent element, the element B is a tetravalent element, the N is nitrogen, and the element Z is an activator in the phosphor, and wherein the phosphor is represented by a composition formula MmAaBbNn:Zz, the phosphor having a composition ratio being (m+z):a:b:n=1:1:1:3.

2. The phosphor according to claim 1, wherein the element M is at least one or more elements selected from the group consisting of beryllium, magnesium, calcium, strontium, barium, zinc, cadmium, and mercury, wherein the element A is at least one or more elements selected from the group consisting of boron, aluminum, gallium, indium, thallium, yttrium, scandium, phosphorus, arsenic, antimony, and bismuth, wherein the element B is at least one or more elements selected from the group consisting of carbon, silicon, germanium, tin, titanium, hafnium, molybdenum, tungsten, chromium, lead, and zirconium, and wherein the element Z is at least one or more elements selected from rare-earth elements or transition metal elements.

3. The phosphor according to claim 1, wherein the element A is aluminum and the element B is silicon.

4. The phosphor according to claim 1 wherein a host material structure of the phosphor substantially does not include oxygen.

5. The phosphor according to claim 1, wherein a value of a mol ratio:z/(m+z) of the element M and the activator element Z is in a range from 0.000 1 to 0.5.

6. The phosphor according to claim 1, wherein the element M is at least one or more elements selected from the group consisting of magnesium, calcium, strontium, barium, and zinc.

7. The phosphor according to claim 1, wherein the element Z is at least one or more elements selected from the group consisting of europium, manganese, and cerium.

8. The phosphor according to claim 7, wherein the element Z is europium.

9. The phosphor according to claim 8, wherein the element M is calcium, the element A is aluminum, and the element B is silicon.

10. The phosphor according to claim 1, wherein the phosphor is in a powder form.

11. The phosphor according to claim 10, wherein an average particle size of the phosphor is 20 μm or smaller and 1 μm or larger.

12. A light source, comprising:

a phosphor according to claim 1; and a light emitting portion emitting light having a wavelength of 300 nm to 550 nm.

wherein a part of the light having a wavelength of 300 nm to 550 nm is used as an excitation source to make the phosphor emit light having a wavelength which is different form the wavelength of 300 nm to 550 nm.

13. A light emitting diode, comprising:

a phosphor according to claim 1; and a light emitting portion emitting light having a wavelength of light from 300 nm to 550 nm.

wherein a part of the light having a wavelength of light from 300 nm to 550 nm is used as an excitation source to make said phosphor emit light having a wavelength which is different from the wavelength of 300 nm to 550 nm.

14. A light emitting diode comprising, the phosphor according to claim 10; and a light emitting portion emitting light having a wavelength of 300 nm to 550 nm, wherein a part of said light having a wavelength of 300 nm to 550 nm is used as an excitation source to make said phosphor emit light having a wavelength which is different from the wavelength of 300 nm to 550 nm.

15. A light source comprising, the phosphor according to claim 10; and a light emitting portion emitting light having a wavelength of 300 nm to 550 nm, wherein a part of said light having a wavelength of 300 nm to 550 nm is used as an excitation source to make said phosphor emit light having a wavelength which is different from the wavelength of 300 nm to 550 nm.

* * * * *